United States Patent
Wong et al.

(10) Patent No.: US 6,846,035 B2
(45) Date of Patent: Jan. 25, 2005

(54) ADJUSTABLE CAB EXTENDER ASSEMBLY METHOD AND APPARATUS

(75) Inventors: Alec C. Wong, Bellevue, WA (US); David C. Warren, Sammamish, WA (US); Wayne K. Simons, Kent, WA (US); Timothy C. Hudsen, Edmonds, WA (US); David M. Roni, Seattle, WA (US); Noelle M. Parlier, Freeland, WA (US); Brian Dressler, Bainbridge Island, WA (US); Steven J. Kirner, Salt Lake City, UT (US)

(73) Assignee: Paccar Inc, Bellevue, WA (US)

(*) Notice: Subject to any disclaimer, the term of this patent is extended or adjusted under 35 U.S.C. 154(b) by 0 days.

(21) Appl. No.: 10/457,046

(22) Filed: Jun. 6, 2003

(65) Prior Publication Data

US 2004/0075298 A1 Apr. 22, 2004

Related U.S. Application Data

(60) Provisional application No. 60/386,902, filed on Jun. 6, 2002.

(51) Int. Cl.[7] .............................. B60J 9/04; B62D 35/00
(52) U.S. Cl. .................................. 296/180.1; 296/180.2
(58) Field of Search .......................... 296/180.1, 180.2, 296/180.3, 180.4, 180.5; 180/903

(56) References Cited

U.S. PATENT DOCUMENTS

| | | | | |
|---|---|---|---|---|
| 3,711,146 A | * | 1/1973 | Madzsar et al. | 296/180.2 |
| 3,834,752 A | * | 9/1974 | Cook et al. | 180/309 |
| 3,945,677 A | | 3/1976 | Servais et al. | |
| 3,951,445 A | | 4/1976 | Tatom | |
| 4,102,548 A | | 7/1978 | Kangas | |
| 4,214,787 A | * | 7/1980 | Chain | 296/180.4 |
| 4,257,640 A | * | 3/1981 | Wiley | 296/180.3 |
| 4,311,334 A | * | 1/1982 | Jenkins | 296/180.4 |

(List continued on next page.)

OTHER PUBLICATIONS

Munson, B.R., et al., *Fundamentals of Fluid Mechanics*, 3rd ed., John Wiley & Sons, Inc., New York, 1998, pp. 552–625.
Society of Automotive Engineers International. *Surface Vehicle Recommended Practice: J1708 and J1587*, issued 1986, revised 1993.
Society of Automotive Engineers, *Recommended Practice for a Serial Control and Communications Vehicle Network, J1939*, issued Nov. 1996, revised Aug. 1997.

*Primary Examiner*—D. Glenn Dayoan
*Assistant Examiner*—H. Gutman
(74) *Attorney, Agent, or Firm*—Christensen O'Connor Johnson Kindness PLLC

(57) ABSTRACT

An adjustable cab extender assembly (200) adapted to couple to a vehicle (100) including a tractor (102) coupled to a trailer (104) is provided. The assembly includes a dynamic cab extender (206) adjustable in length and operable to be disposed in a gap (106) extending between the tractor and the trailer. The assembly includes a speed sensor (268) operable to sense a speed of the vehicle. The assembly also includes a control system (208) coupled in signal communication with the speed sensor and coupled to the dynamic cab extender. The control system is operable to automatically adjust a longitudinal length of the dynamic cab extender to selectively adjust a proximity of a trailing edge of the dynamic cab extender relative to a front end of the trailer when the sensed speed exceeds a selected speed. The control system may also place the dynamic cab extender in a stowed position.

33 Claims, 8 Drawing Sheets

U.S. PATENT DOCUMENTS

| | | | |
|---|---|---|---|
| 4,343,505 A | * 8/1982 | Levassor | 296/180.2 |
| 4,518,188 A | * 5/1985 | Witten | 296/180.2 |
| 4,611,796 A | 9/1986 | Orr | |
| 4,611,847 A | * 9/1986 | Sullivan | 296/180.2 |
| 4,685,715 A | * 8/1987 | Hardin | 296/180.3 |
| 4,693,506 A | 9/1987 | Massengill | |
| 4,746,160 A | * 5/1988 | Wiesemeyer | 296/180.2 |
| 4,824,165 A | 4/1989 | Fry | |
| 4,883,307 A | 11/1989 | Hacker et al. | |
| 4,904,015 A | 2/1990 | Haines | |
| 5,078,448 A | * 1/1992 | Selzer et al. | 296/180.2 |
| 5,190,342 A | 3/1993 | Marlowe et al. | |
| 5,522,637 A | 6/1996 | Spears | |
| 5,536,062 A | 7/1996 | Spears | |
| 5,595,419 A | 1/1997 | Spears | |
| 5,653,493 A | 8/1997 | Spears | |
| 6,264,144 B1 | 7/2001 | Thornton | |
| 6,338,524 B1 | 1/2002 | Wu | |
| 6,428,084 B1 | * 8/2002 | Liss | 296/180.3 |
| 2003/0227194 A1 | * 12/2003 | Farlow et al. | 296/180.4 |

* cited by examiner

ADJUSTABLE CAB EXTENDER ASSEMBLY METHOD AND APPARATUS

CROSS-REFERENCE TO RELATED APPLICATION

This application claims the benefit of U.S. Provisional Patent Application Ser. No. 60/386,902, filed on Jun. 6, 2002, priority from the filing date of which is hereby claimed under 35 U.S.C. § 119 and the disclosure of which is hereby expressly incorporated by reference.

FIELD OF THE INVENTION

The present invention relates generally to vehicle cab extenders and, more particularly, to vehicle cab extenders adjustable in length.

BACKGROUND OF THE INVENTION

Aerodynamic drag accounts for over 50% of a tractor trailer truck's total fuel consumption at highway speeds above 55 mph. A gap exits between the tractor and trailer which tends to trap air, creating a low-pressure wake behind the tractor, resulting in a net pressure difference and, therefore, creating drag. The gap distance between the tractor-trailer combination is dependent on the position of what is known in the art as a fifth wheel. The fifth wheel is a bearing, which serves as a coupling between the tractor and trailer. The position of the fifth wheel is adjusted to accommodate different weight distributions based on the load of the trailer. The gap distance typically varies from about 36 to 48 inches. The drag coefficient of the vehicle is dependent on the gap distance. More specifically, the larger the gap distance, the larger the drag coefficient, and conversely, the smaller the gap distance, the smaller the drag coefficient.

The gap causes the formation of a turbulent air mass creating a low-pressure wake behind the tractor, decreasing the fuel efficiency of the vehicle. The goal in aerodynamic design is to produce shapes that delay air separation. Maximum efficiency is achieved when airflow remains attached and moves parallel to the side of the vehicle such that air separation from the tractor is reduced and a constant and smooth airflow along the side of the vehicle is achieved.

One solution to reduce the gap distance has been to use fixed cab extenders to reduce the effect of unwanted drag. The fixed cab extenders are planar members which extend aft longitudinally from a back end of the tractor substantially parallel with the sides of the tractor. Ideally, the fixed cab extenders would extend across the entire gap between the tractor and trailer, which, as stated above, typically varies from 36 to 48 inches, to obtain maximum aerodynamic efficiency. However, if the fixed cab extenders were configured as described, as the tractor turned relative to the trailer, the trailer would impact and damage the fixed cab extenders.

Therefore, previously developed fixed cab extenders are positioned to have a large clearance space between a vertical trailing edge of the fixed cab extender and a front end of the trailer. This clearance space is required to prevent the front end of the trailer from impacting the fixed cab extenders during sharp, typically slow speed turns. Thus, there exists a need for a cab extender that may be selectively deployed within the clearance space between the tractor and trailer at high speeds to improve fuel economy, and retracted at low speeds to allow the tractor trailer truck to maneuver. Further, there exists a need for a cab extender that is adjustable in length to accommodate the variability in spacing encountered between the tractor and trailer.

One previously developed attempt at fulfilling some of these needs is disclosed in U.S. Pat. No. 3,711,146 issued to Madzsar (hereinafter "Madzsar"). Although the cab extender assembly disclosed in Madzsar may be somewhat effective, it is not without its problems. For instance, Madzsar teaches adjusting the length of the cab extenders based upon a sensed amount of articulation between a tractor and trailer and not based upon a speed of the vehicle. Therefore, the system of Madzsar lags behind actual conditions. More specifically, the cab extenders are not retracted until after the tractor and trailer are articulated, thus the potential exists that the cab extenders will not be retracted in time to prevent damage to the cab extenders, especially during emergency maneuvers. Thus, there exists a need for a cab extender assembly wherein the cab extenders are retracted prior to the act of articulation to impede damage to the cab extenders. Further, the cab extenders of Madzsar are not positionable into both a stowed position and a deployed position since Madzsar does not teach placing the cab extenders into a stowed position. Thus, access to the fifth wheel and accessories located between the tractor and trailer is impeded. Further, the fully retracted length of the cab extenders must be unduly short to permit full articulation of tractor relative to the trailer.

SUMMARY OF THE INVENTION

One embodiment of an adjustable cab extender assembly formed in accordance with the present invention is provided. The adjustable cab extender assembly is adapted to couple to a vehicle including a tractor coupled to a trailer. The adjustable cab extender assembly includes a dynamic cab extender adjustable in length and operable to be disposed in a gap extending between a back end of the tractor and a front end of the trailer. The adjustable cab extender assembly also includes a speed sensor operable to sense a speed of the vehicle. The adjustable cab extender assembly further includes a control system coupled in signal communication with the speed sensor and coupled to the dynamic cab extender. The control system is operable to automatically adjust a longitudinal length of the dynamic cab extender to selectively adjust a proximity of a trailing edge of the cab extender relative to the front end of the trailer when the sensed speed exceeds a selected speed.

Another embodiment of an adjustable cab extender assembly formed in accordance with the present invention is provided. The adjustable cab extender assembly is adapted to couple to a vehicle including a tractor coupled to a trailer. The adjustable cab extender assembly includes a dynamic cab extender operable to be disposed in a gap extending between a back end of the tractor and a front end of the trailer. The adjustable cab extender assembly includes a control assembly coupled to the dynamic cab extender. The control assembly includes a first actuator adapted to adjust a longitudinal length of the dynamic cab extender to selectively adjust the proximity of a trailing edge of the dynamic cab extender to the front end of the trailer. The control system further includes a second actuator adapted to configure the dynamic cab extender between a stowed position and a deployed position in which the dynamic cab extender is substantially aligned with a side of the vehicle.

Still another embodiment of an adjustable cab extender assembly formed in accordance with the present invention is provided. The adjustable cab extender assembly is adapted to couple to a vehicle including a tractor coupled to a trailer. The adjustable cab extender includes a dynamic cab extender adjustable in length and adapted to be coupled to the vehicle. The dynamic cab extender is configurable between a deployed position, a stowed position, and an extended position. In the deployed position, the dynamic cab extender is oriented substantially coplanar with a side of the vehicle in a gap extending between a back end of the tractor and a front end of the trailer. In the stowed position, the dynamic cab extender is stowed behind the back end of the tractor. In the extended position, the dynamic cab extender is oriented substantially coplanar with the side of the vehicle in the gap. A length of the dynamic cab extender when in the extended position exceeds a length of the dynamic cab extender when in the deployed position.

One embodiment of a method of adjusting a longitudinal length of a cab extender disposed in a gap located between a tractor and a trailer and performed in accordance with the present invention is provided. The method includes sensing a speed of the tractor. The method further includes automatically adjusting a longitudinal length of the dynamic cab extender to selectively position a trailing edge of the dynamic cab extender a selected distance from a front end of the trailer when the sensed speed of the tractor exceeds a selected speed.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

FIGS. 1–8 depict one embodiment of a cab extender assembly 200 formed in accordance with the present invention. Although the illustrated embodiment of the cab extender assembly 200 is described as implemented in conjunction with a vehicle 100 having a tractor 102 coupled to a trailer 104, those skilled in the relevant art will appreciate that the disclosed cab extender assembly 200 is illustrative in nature and should not be construed as limited to application with a vehicle having a tractor and a trailer. It should therefore be apparent that the cab extender assembly 200 has wide application, and may be used in any situation wherein selectively manipulating the drag of any type of vehicle is desired.

Figure 1:
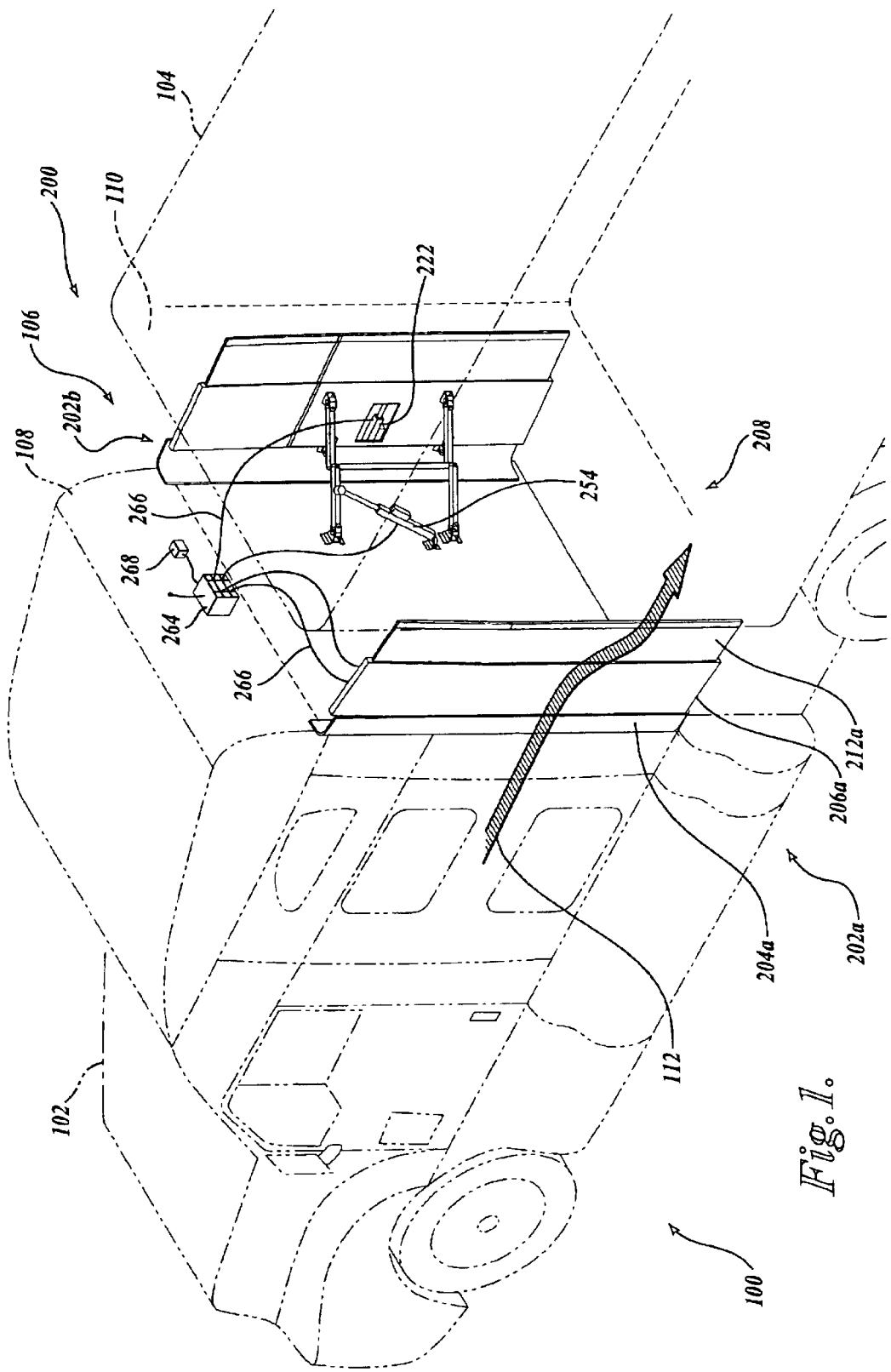
FIG. 1 is an isometric view of one embodiment of a cab extender assembly formed in accordance with the present invention and coupled to a vehicle having a tractor and a trailer, the cab extender assembly including a first dynamic cab extender and a second dynamic cab extender each shown in an extended position, a pair of fixed cab extenders, and a control system for selectively actuating the dynamic cab extenders between stowed, deployed, and extended positions.
Figure 2:
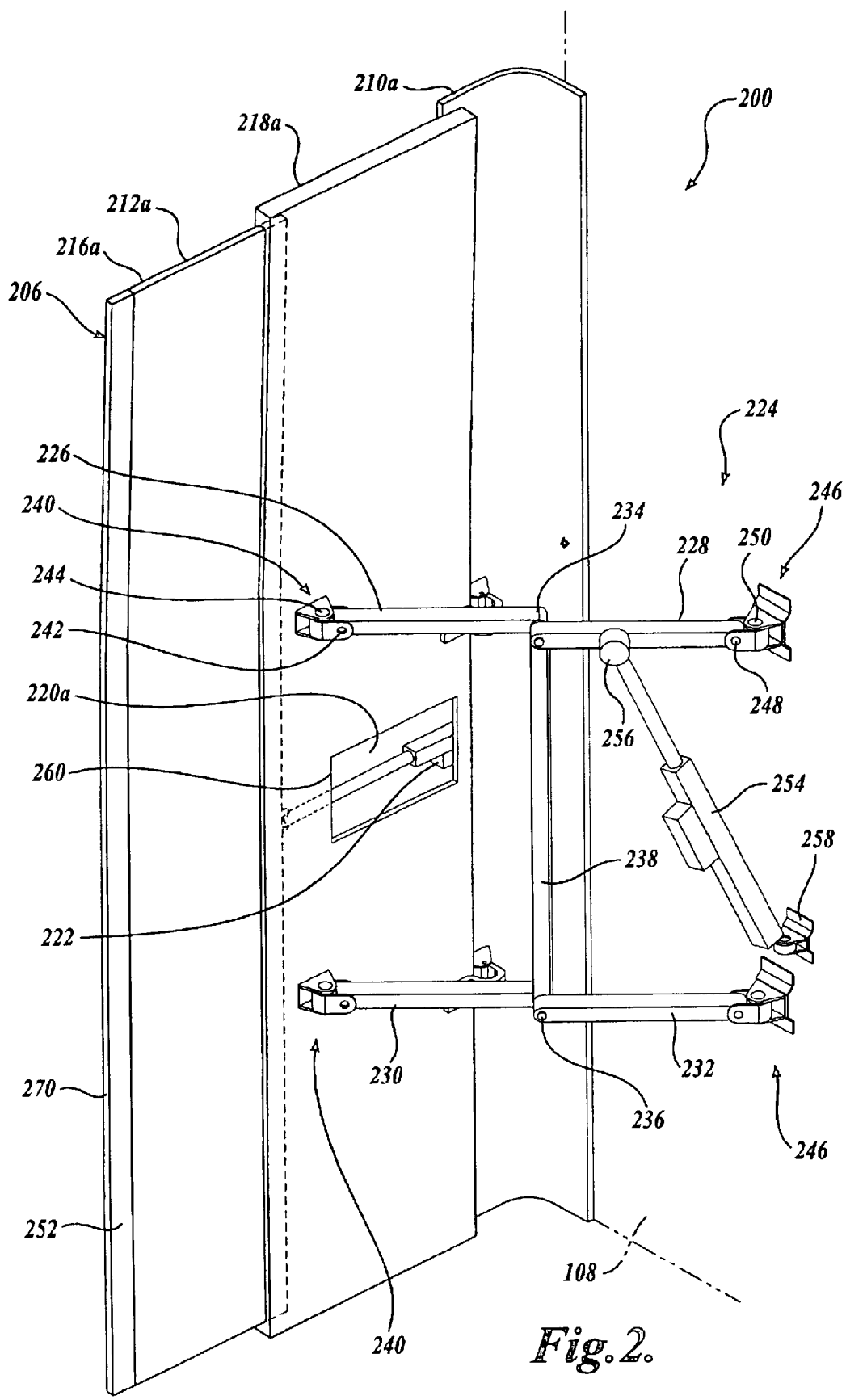
FIG. 2 is an isometric detail view of the cab extender assembly of FIG. 1 depicting the first dynamic cab extender in the extended position and a portion of the control system.
Figure 3:
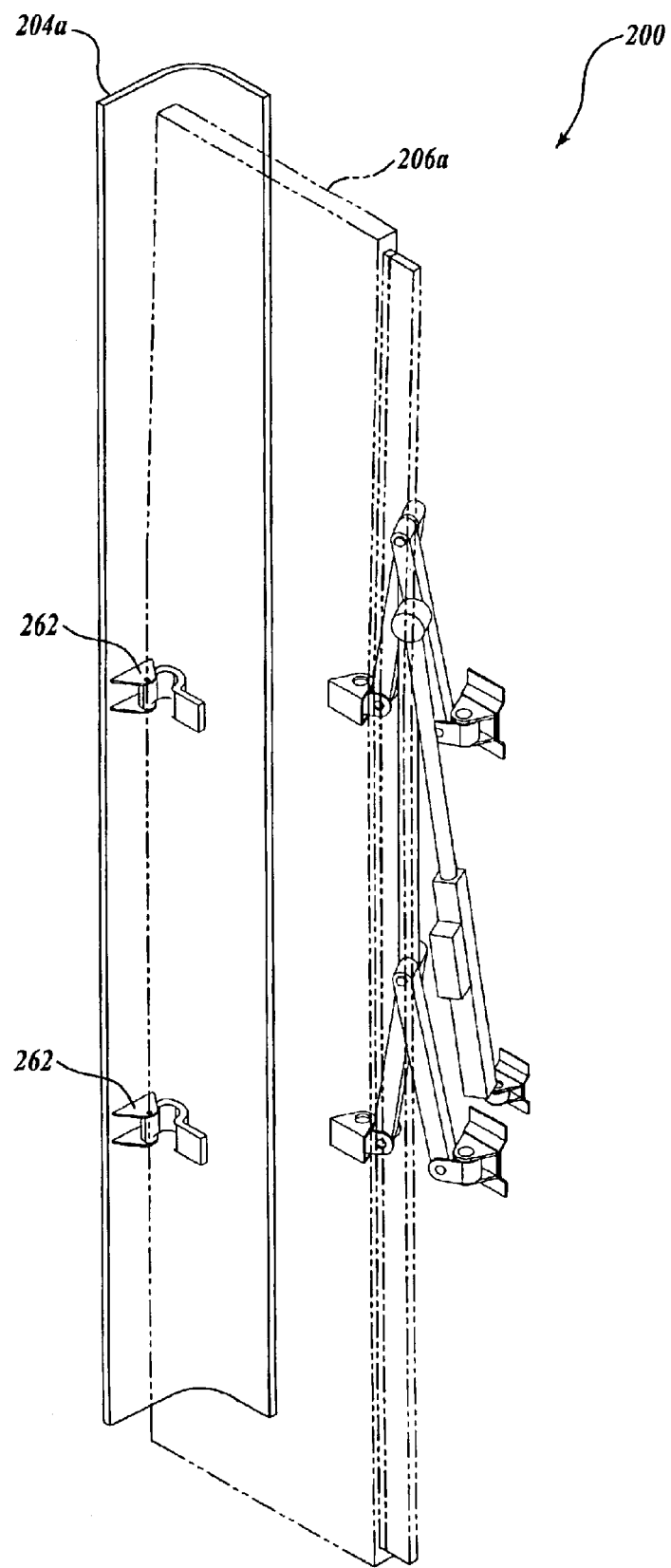
FIG. 3 is an isometric view of the first dynamic cab extender and the portion of the control system of FIG. 2 depicting the first dynamic cab extender in the stowed position, wherein the first dynamic cab extender is shown in phantom.
Figure 5:
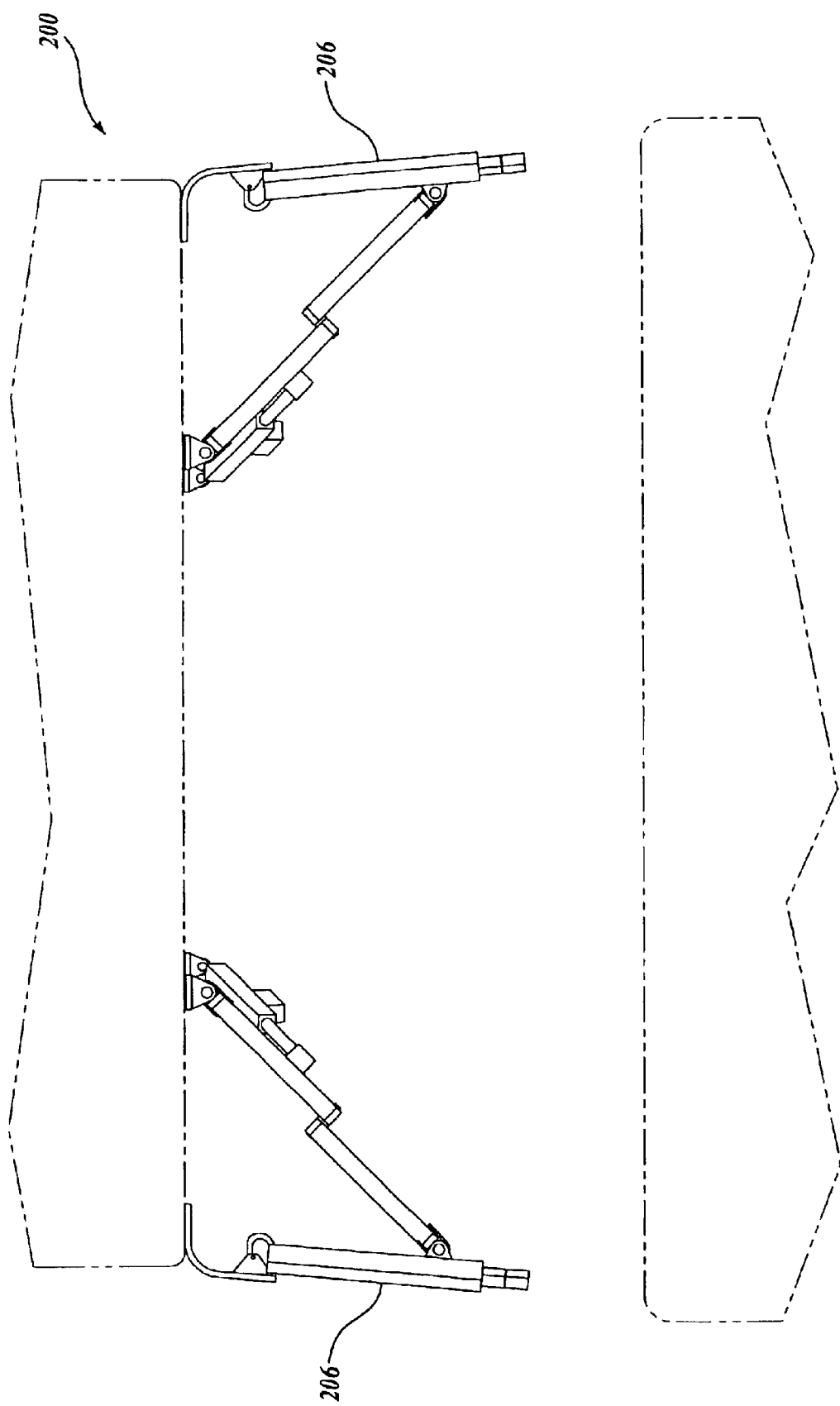
FIG. 5 is a top view of the cab extender assembly and vehicle depicted in FIG. 1 wherein the first and second dynamic cab extenders are each depicted in a deployed position.
Figure 6:
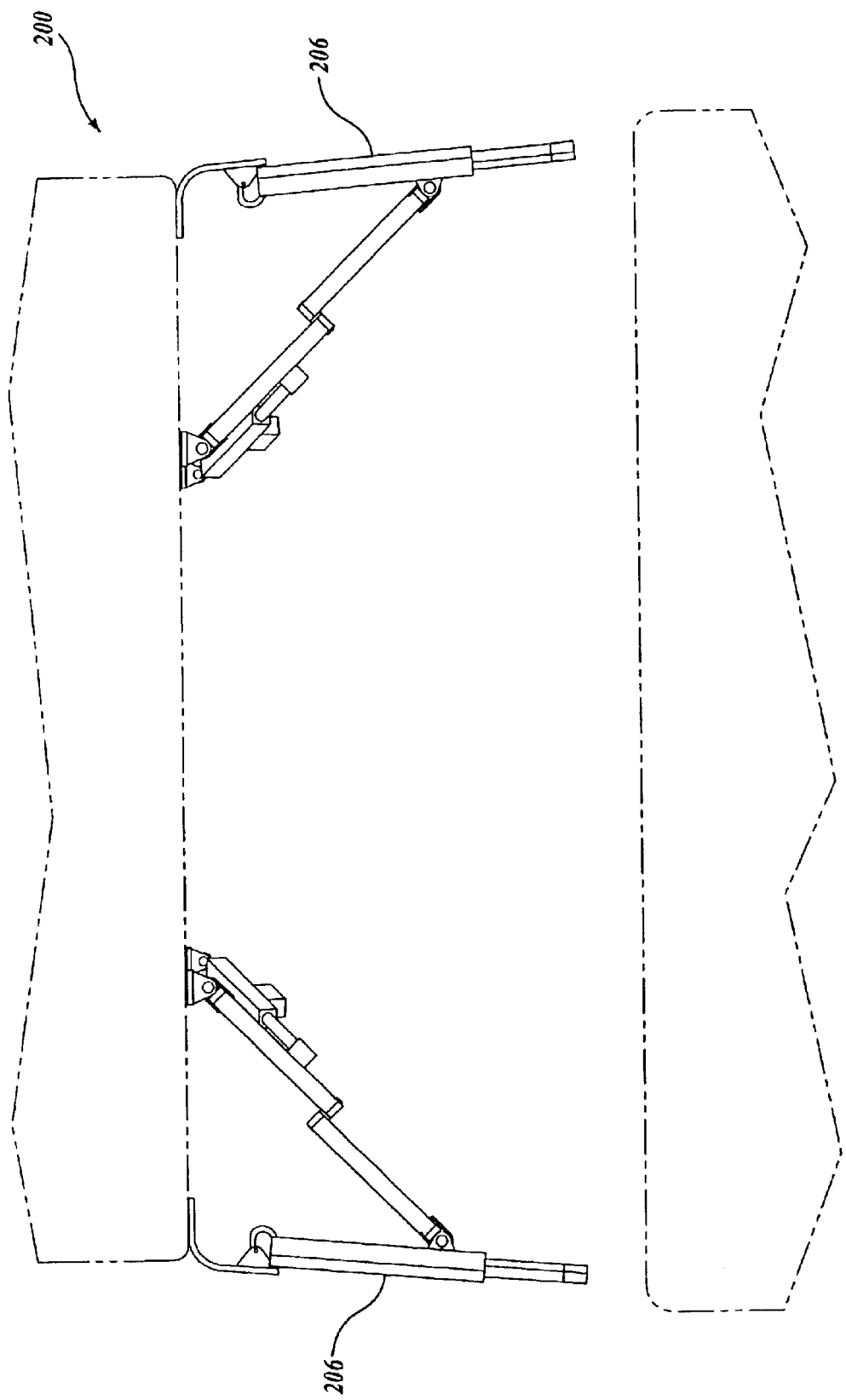
FIG. 6 is a top view of the cab extender assembly and vehicle depicted in FIG. 1 wherein the first and second dynamic cab extenders are each depicted in a partially extended position.
Figure 7:
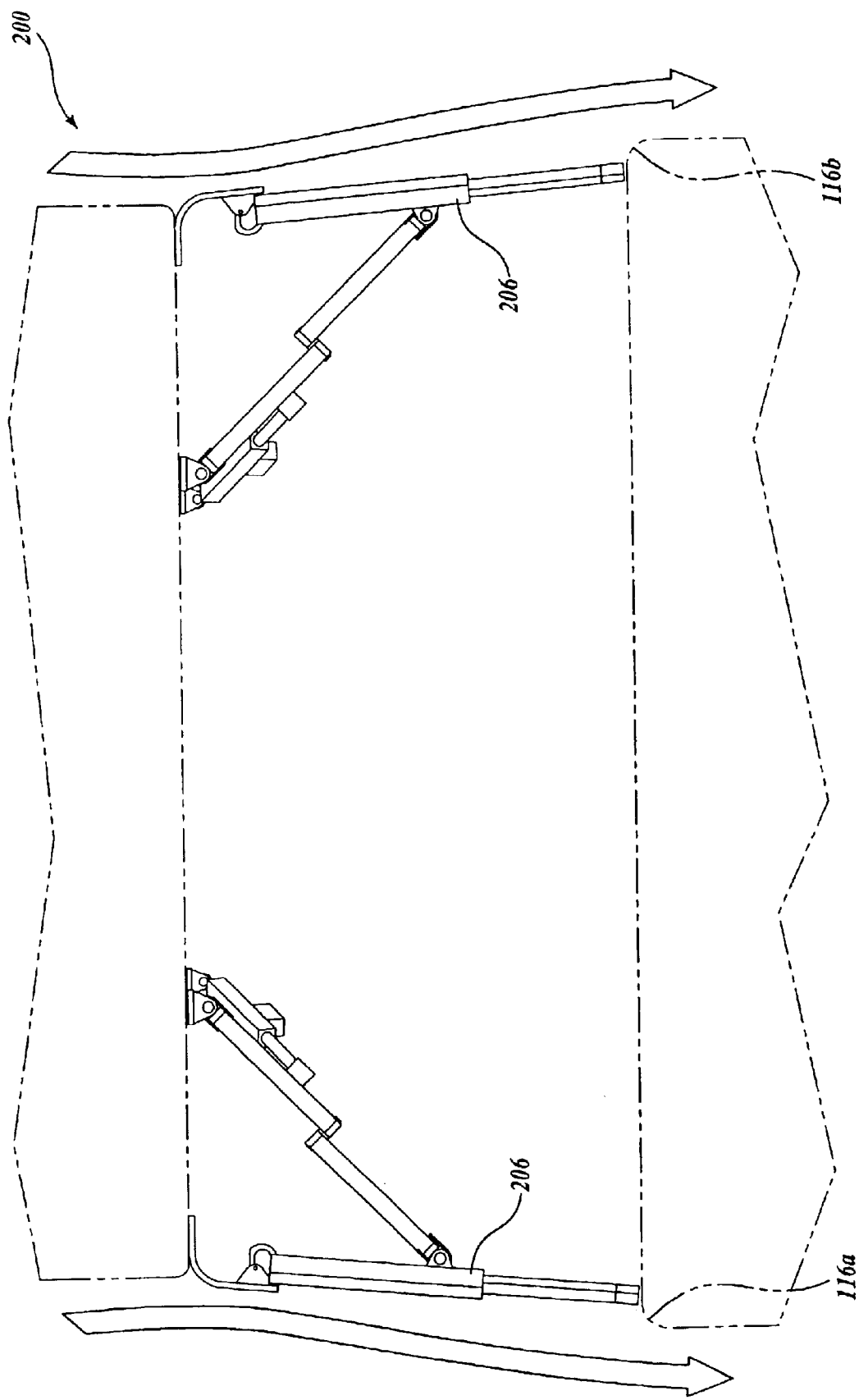
FIG. 7 is a top view of the cab extender assembly and vehicle depicted in FIG. 1 wherein the first and second dynamic cab extenders are each depicted in a fully extended position.

Referring to FIGS. 1 and 2 and generally described, the cab extender assembly 200 permits the selective manipulation of the aerodynamic drag of the vehicle 100. The cab extender assembly 200 includes a pair of cab extender systems 202a and 202b, each one having a fixed cab extender 204 and a dynamic cab extender 206. The fixed and dynamic cab extenders 204 and 206 may be disposed along a side of the vehicle 100 in a gap 106 extending between a back end 108 of the tractor 102 and a front end 110 of the trailer 104. A control system 208 may selectively position the dynamic cab extenders 206 between a stowed position as shown in FIG. 4, a deployed position as shown in FIG. 5, a partially extended position as shown in FIG. 6, a fully extended position as shown in FIG. 7, and iterations therebetween.

Figure 4:
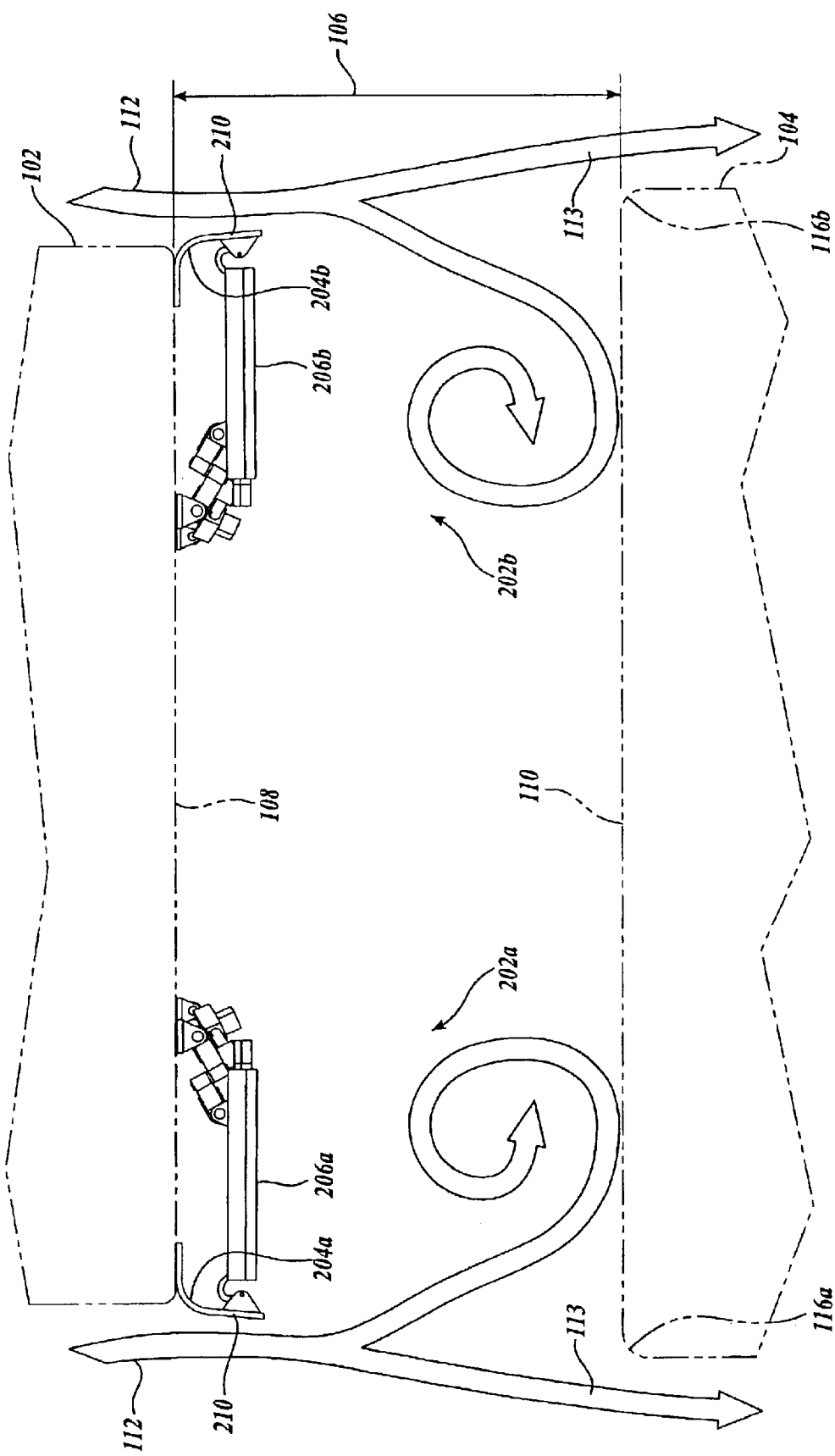
FIG. 4 is a top view of the cab extender assembly and vehicle depicted in FIG. 1 wherein the first and second dynamic cab extenders are each depicted in a stowed position.

More specifically, during low speed operations of the vehicle 100, the dynamic cab extenders 206 are positioned in the stowed position depicted in FIG. 4 such that the front end 110 of the trailer 104 does not impact the dynamic cab extenders 206 during turns. During high speed operations of the vehicle 100, where the vehicle is restricted from making sharp turns due to the speed of the vehicle 100, the dynamic cab extenders 206 are actuated first into the deployed position depicted in FIG. 5 and then to the fully extended position depicted in FIG. 7 to increase the aerodynamic efficiency of the vehicle 100.

The detailed description will now focus upon the cab extender systems 202. In the preferred embodiment illustrated in FIGS. 1–8, the elements of the left and right cab extenders systems 202a and 202b are mirror images of one another. Therefore, where context permits, reference in the following description to an element of one of the left or right cab extender systems 202a or 202b shall also be understood as also referring to the corresponding element in the other cab extender system. A numbering scheme is used in which a suffix of "a" or "b" may be added to a reference numeral to designate a component associated with the left or right cab extender system 202a and 202b respectively, or the suffix may be omitted to refer to both simultaneously.

Referring to FIGS. 1 and 4, as mentioned above, each cab extender system 202a and 202b includes a fixed cab extender 204 and a dynamic cab extender 206. The fixed cab extenders 204 are, coupled to the back end 108 of the vehicle 100 so as to span a portion of the gap 106 extending along the sides of the vehicle 100 between the back end 108 of the tractor 102 and the front end 110 of the trailer 104. The fixed cab extenders 204 are aligned to aerodynamically direct at least a portion 113 of the slipstream 112 passing along the sides of the tractor 102 to the sides of the trailer 104. To this end, an outer planar surface 210 of each the fixed cab extender 204 is oriented to direct a portion 113 of the slipstream 112 towards the front corner edges 116 of the trailer 104 where the front end 110 of the trailer 104 intersects the sides of the trailer 104. Oriented as described, the fixed cab extenders 204 are oriented substantially parallel with a longitudinal axis of the vehicle 100.

The fixed cab extenders 204 are of a selected length chosen to permit the tractor 102 to pivot about the trailer 104 a selected angular range without the front end 110 of the trailer 104 contacting the fixed cab extenders 204. The selected angular range is greater than about 45 degrees, and preferably over about 90 degrees. Ideally, the selected angular range is greater than about 180 degrees such that the tractor 102 may pivot 90 degrees to the left or right relative to the trailer without the trailer 104 impacting the fixed cab extenders 204. The fixed cab extenders 204 may be formed from any suitable rigid material, such as steel, aluminum, fiberglass, etc. Preferably, the fixed cab extenders 204 are thin planar members, having the selected length described above and a height substantially equal to the height of the tractor 102 and/or trailer 104.

Referring to FIGS. 1 and 2, this detailed description will now focus upon the dynamic cab extenders 206. The dynamic cab extenders 206 are coupled to the back end 108 of the tractor 102. When the dynamic cab extenders 206 are in a deployed position (see FIGS. 5–7), they substantially align with the fixed cab extenders 204 to span an additional portion of the gap 106 extending along the sides of the vehicle 100 between a back end 108 of the tractor 102 and the front end 110 of the trailer 104. The dynamic cab extenders 204, when deployed, are aligned to aerodynamically direct the slipstream 112 passing along the sides of the tractor 102 to the sides of the trailer 104, to reduce the separation of the slipstream from the vehicle. To this end, an outer planar surface 212 of the dynamic cab extenders 206 are oriented to direct the slipstream towards the front corner edges 116 (see FIG. 7) of the trailer 104 where the front end 110 of the trailer 104 intersects the sides of the trailer 104. Oriented as described, the dynamic cab extenders 204, when deployed, are oriented substantially parallel with a longitudinal axis of the vehicle 100.

Each of the dynamic cab extenders may include an outer panel 216 and an inner panel 218. The outer panel 216 is adapted to be reciprocated relative to the inner panel 218. More specifically, the outer panel 216 may be reciprocated linearly along a longitudinal axis of the vehicle 100 to be selectively received within a cavity 220 of the inner panel 218. In the illustrated embodiment, well known slider assemblies (not shown), one suitable example being slider assemblies manufactured by Pacific Bearing Company, located in Rockford, Ill., Model Nos. RRS45 and RR45-560, and sold under the trade name REDI-LINEAR GUIDES, are disposed at the top and bottom of the cavity 220 of the inner panel 218 to slidingly receive the outer panel 216.

An extender actuator 222 is disposed within the cavity 220. One example of a suitable extender actuator 222 is an electromechanical actuator manufactured by Yale Industrial Products, Inc., Duff-Norton Division, located in Charlotte, N.C., Model No. PTMDO1-1906 with a 12 inch stroke. One end of the extender actuator 222 is coupled to the outer panel 216 and a second end of the extender actuator 222 is coupled to the inner panel 218. The extender actuator 222 is oriented substantially parallel to a longitudinal axis of the vehicle 100. The extender actuator 222 is selectively adjustable in length. By adjusting the length of the extender actuator 222, the outer panel 216 is selectively reciprocated relative to the inner panel 218, thereby adjusting the overall length of the dynamic cab extender 206. The outer and inner panels 216 and 218 may be formed from any suitable material, such as aluminum sheets coupled to an internal frame (not shown).

The outer panel 216 may include an actuator access aperture 260 as best seen in FIG. 1. The dynamic cab extenders 206 are pivotally coupled to the back end 108 of the tractor 102 by a pair of hinges 262 best shown in FIG. 3. The outer panel 216 may include a resilient end portion 252, the resilient end portion 252 formed from a resilient material such as rubber, foam, etc. The material and location of the resilient end portion 252 is preferably selected to withstand contact by the front end of the trailer.

Although a specific extender actuator 222 is described and depicted relative to the illustrated embodiment, it should be apparent to those skilled in the art that the panels 216 and 218 may be reciprocated relative to one another by any suitable means. For instance, the panels may be suitably actuated relative to one another by any number of actuators, including a gear or rack and pinion actuation system, pulley actuation system, drive belt actuation system, pneumatic actuation system, magnetic actuation system, hydraulic actuation system, etc.

Further, although the illustrated embodiment depicts an outer panel 216 reciprocated relative to an inner panel 218 to selectively adjust the length of the dynamic cab extender 206, it should be apparent to those skilled in the art that the invention is not so limited. For instance, the dynamic cab extenders 206 may each be made from a plurality of panels exceeding two, or made from a single panel reciprocated relative to the vehicle, such as from a cavity disposed in the tractor 102 of the vehicle 100. The dynamic cab extenders 206 may include a single panel having an expandable accordion like material attached to a leading edge of the panel and the tractor wherein the material expands in the gap as the single panel is reciprocated towards the tractor 104.

Further still, although the outer panel 216 of the illustrated embodiment is depicted as reciprocating within a cavity 220 of the inner panel 218, it should be apparent that other arrangements are suitable for use with the present invention. For instance, the inner panel 218 may be received within a cavity of the outer panel 216 or the outer panel 216 may be reciprocated to the side of the inner panel 218.

Referring to FIGS. 1 and 2, this detailed description will now focus upon the control system 208. The control system 208 includes all components utilized in configuring the dynamic cab extenders 206 between the stowed, deployed, and extended positions. The control system 208 of the illustrated embodiment includes the following sub assemblies: extender actuators 222, linkage assemblies 224, deployment actuators 254, controller 264, speed sensor 268, and other related components, all of which will be described in further detail following, with the exception of the extender actuators 222 which were described above.

Referring to FIG. 2, the detailed description will now focus upon a sub assembly of the control system, the linkage assemblies 224. Each linkage assembly 224 includes an upper linkage group having a first link 226 and a second link 228 and a lower linkage group having a first link 230 and a second link 232. One end of each of the first links 226 and 230 are coupled to the dynamic cab extenders 206 and one end of each of the second links 228 and 232 are coupled to the back end 108 of the tractor. The first links 226 and 230 are coupled to the dynamic cab extender 206 by a pair of joints 240. Each joint 240 has a first axis of rotation 242 and a second axis of rotation 244 providing two degrees of freedom of movement. Likewise, the second links 228 and 232 are coupled to the back end 108 of the tractor by a pair of joints 246. Each joint 246 has a first axis of rotation 248 and at second axis of rotation 250 providing two degrees of freedom of movement.

The second ends of the first and second links 226 and 228 of the upper linkage group are pivotally coupled to one another at a first location 234. The second ends of the first and second links 230 and 232 of the lower linkage group are pivotally coupled to one another at a second location 236. A spreader bar 238 spans between and is pivotally coupled to the first and second locations 234 and 236 such that any movement of the first location is transferred to the second location 236.

Coupled to the linkage assembly 224 is a deployment actuator 254. One example of a suitable deployment actuator 254 is an electromechanical actuator manufactured by Yale Industrial Products, Inc., Duff-Norton Division, located in Charlotte, N.C., Model No. TMDO1-1906 with a 12 inch stroke. One end of the deployment actuator 254 may be coupled to the second link 228 of the upper linkage group by a well known ball joint 256. A second end of the deployment actuator 254 may be coupled to the back end 108 of the tractor by a well known coupler 258. The deployment actuator 254 is selectively adjustable in length. By selectively adjusting the length of the actuator 254, the dynamic cab extenders 206 may be selectively configured from the stowed position depicted in FIG. 3 to the deployed position show in FIG. 2.

Although a specific deployment actuator is described and depicted relative to the illustrated embodiment, it should be apparent to those skilled in the art that the dynamic cab extenders 206 may be reciprocated between the stowed and deployed positions by any suitable means. For instance, the panels may be suitably actuated relative to one another by any number of actuators now known or to be developed, such as magnetic actuators, pneumatic actuators, hydraulic actuators, etc.

Referring to FIG. 1, the control system 208 further includes a controller 264. The controller 264 is adapted to selectively control the actuation of the extender actuators 222 and the deployment actuators 254. A plurality of cables 266 couple the controller 264 in signal communication with the actuators 222 and 254. The controller 264 may send command signals via the cables 266 to the actuators 222 and 254 to selectively adjust the length of each of the actuators 222 and 254.

The controller 264 is coupled in signal communication with a speed sensor 268. The speed sensor 268 is adapted to sense a speed of the vehicle and relay the sensed speed to the controller 264. Preferably the speed sensor 268 ties into an existing data bus of the vehicle to obtain vehicle speed data. Alternately, the speed sensor 268 may be an existing original equipment manufacture sensor that comes with the vehicle when purchased or may be a later installed sensor.

Referring to FIG. 1, in light of the above description of the components of the cab extender assembly 200, the operation of the cab extender assembly 200 will now be described. During low speed operations of the vehicle 100, the dynamic cab extenders 206 are positioned in the stowed position depicted in FIGS. 3 and 4 such that the front end 110 of the trailer 104 does not impact the dynamic cab extenders 206 during turns. The configuration of the dynamic cab extenders 206 in the stowed position is accomplished by the control system 208. When the speed sensor 268 senses a speed of the vehicle 100 below a selected speed, such as 40 mph, the controller 264 selectively actuates the deployment actuators 254 in their fully retracted positions. As is apparent to those skilled in the art and others, by placing the deployment actuators 254 in their fully retracted positions, the dynamic cab extenders 206 are swung inward into stowed positions. In the stowed position, the dynamic cab extenders 206 are oriented such that their outer surfaces 212 are oriented substantially perpendicular to the longitudinal axis of the vehicle 100. In the stowed position, the dynamic cab extenders 206 are disposed adjacent the back end 108 of the tractor 102 of the vehicle 100.

During high speed operations of the vehicle 100, where the vehicle is restricted from turning due to the speed of the vehicle 100, the dynamic cab extenders 206 are actuated into the deployed positions depicted in FIGS. 5–7 to increase the aerodynamic properties of the vehicle 100. More specifically, when the speed sensor 268 senses a speed of the vehicle 100 above a predetermined speed, such as 50 mph, the controller 264 selectively actuates the deployment actuators 254 in their fully extended positions. As is apparent to those skilled in the art and others, by placing the deployment actuators 254 in their fully extended positions, the dynamic cab extenders 206 are swung outward into the deployed positions. In the deployed position, the dynamic cab extenders 206 are oriented such that their outer surfaces 212 are oriented substantially parallel with the sides of the vehicle 100 and substantially parallel with the longitudinal axis of the vehicle 100.

Referring to FIGS. 1 and 2, once the dynamic cab extenders are in the deployed position shown in FIG. 5, the extender actuators 222 are extended by the controller 264 to a selected length. Moreover, the outer panel 216 is reciprocated outward from the cavity 220 of the inner panel 218 such that a trailing edge 270 of the outer panel 216 approaches the front end 110 of the trailer 104 to preferably contact or nearly so, the front end 110 of the trailer 104 as shown in FIG. 7.

Alternately, the proximity of the trailing edges 270 of the dynamic cab extenders 206 may be selectively varied. More specifically, as the speed of the vehicle 100 increases, the ability of the tractor 102 to turn relative to the trailer 104 is gradually reduced due to the increased speed of the vehicle 100. Thus, the trailing edges 270 of the dynamic cab extenders 206 may approach closer to the front end 110 of the trailer 104 as the speed of the vehicle 100 increases. The amount of increased extension of the outer panel 216 relative to a corresponding increase in the speed of the tractor 102 is a design choice, depending upon the vehicle 100 and its maximum turning radius at a given speed.

The controller 264 is adapted to receive input data indicating the gap distance 106 between the back end 108 of the tractor 102 and the front end 110 of the trailer 104. Thus, the amount of extension of the outer panel 216 at the fully extended position of FIG. 7 may be selected to match the particular gap distance 106 of a specific rig set up, which as stated above, typically varies between 36 to 48 inches. The gap distance 106 may be entered by any suitable means, such as by the user, measured automatically such as by a laser measuring system, etc. Alternately, the extension may be controlled by proximity sensors (not shown) such that when the trailing edges 270 are a selected distance away from the front end 110 of the trailer 102, or alternately contact the front end 110 of the trailer 102, the proximity sensors are activated to halt further extension of the dynamic cab extenders.

Figure 8:
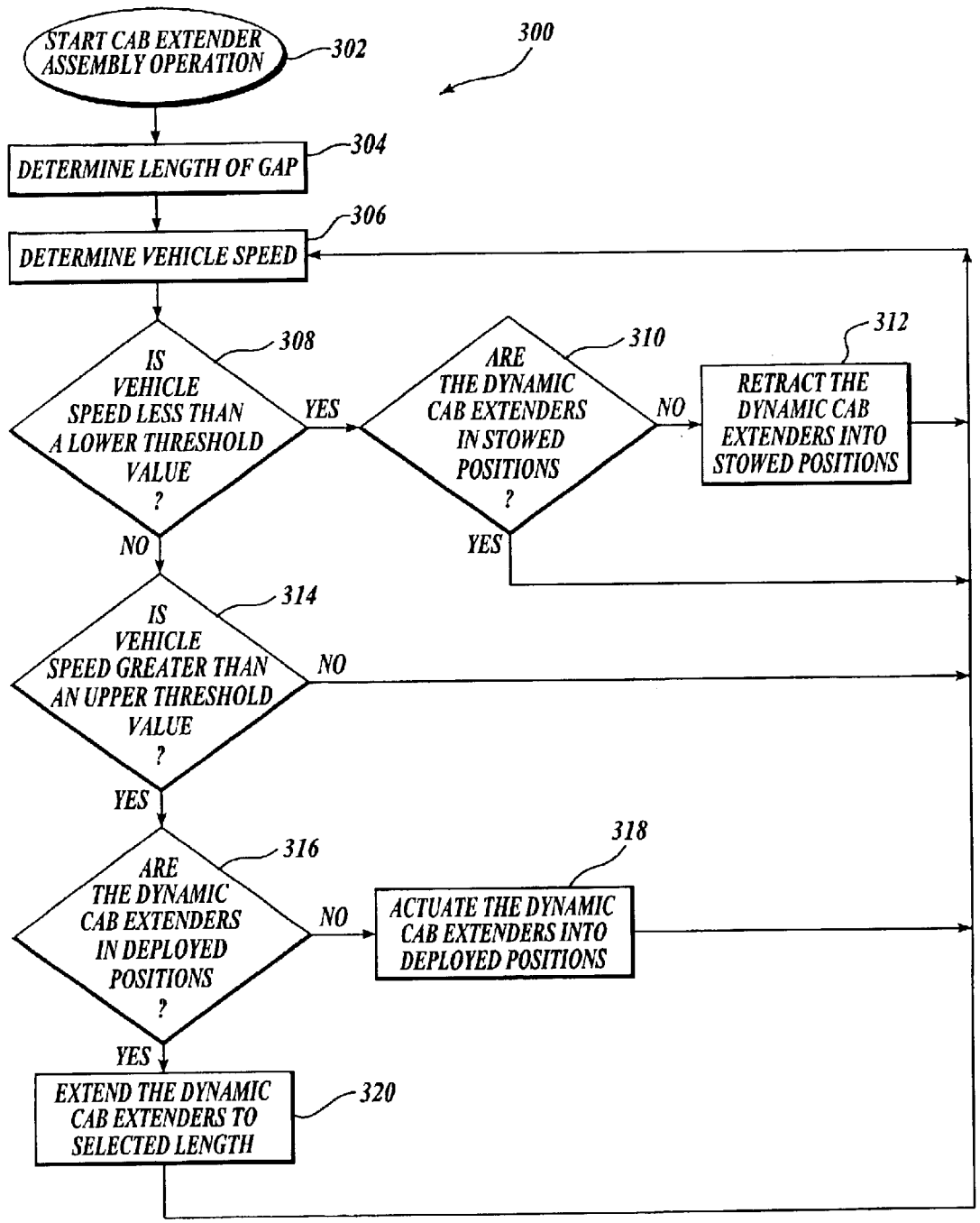
FIG. 8 is a functional flow diagram illustrating processing performed by a controller in controlling the function of the cab extender assembly.

Turning to FIG. 8, the operation of the cab extender assembly will now be more fully described by examining the control logic of the controller. FIG. 8 is a functional flow diagram illustrating processing performed by the controller in controlling the function of the cab extender assembly. As will be better understood from the following description, the controller is used to automatically configure the dynamic cab extenders between their stowed, deployed, and extended positions. Since electronic controls and computer system operable to perform the functions described in relation to FIG. 8 are well known, no specific hardware for performing the described functions is described herein for the sake of brevity.

The cab extender assembly control logic routine 300 begins at block 302 and proceeds to block 304, wherein the length of the gap is determined. The length of the gap may be determined by any number of methods, such as user input, automatically measured through a device, such as a laser based distance measuring tool, etc. Once the length of the gap is determined, the routine proceeds to block 306, where the speed of the vehicle is determined, preferably from extracting the speed of the vehicle from the data bus of the vehicle. The speed of the vehicle is input into decision block 308. If the speed of the vehicle is less than a lower threshold value, such as 40 mph, then the routine proceeds to decision block 310. At decision block 310 it is determined if the dynamic cab extenders are in a stowed position. If the dynamic cab extenders are in a stowed position, then the routine returns to block 306. If the dynamic cab extenders are not in a stowed position, then the routine proceeds from decision block 310 to block 312, wherein the dynamic cab extenders are actuated into a stowed position to permit the vehicle to perform sharp turns. The routine then returns to block 306.

Returning to decision block 308, if the vehicle speed is greater than a lower threshold value, the routine proceeds to block 314. At decision block 314, it is determined if the vehicle speed is greater than an upper threshold value, such as 50 mph. If the vehicle speed is not greater than the upper threshold value, then the routine returns to block 306. If the vehicle speed is greater than the upper threshold value then the routine proceeds to block 316, wherein it is determined if the dynamic cab extenders are in deployed positions. If the dynamic cab extenders are not in deployed positions, then the routine proceeds to block 318 wherein the dynamic cab extenders are actuated into deployed positions. The routine then returns to block 306.

Returning to decision block 316, if the dynamic cab extenders are in deployed positions, the routine proceeds to block 320 wherein the dynamic cab extenders are extended to a selected length, the selected length preferably chosen to place a trailing edge of each dynamic cab extender in proximity to the front end of the trailer. The routine then returns to block 306. The control logic routine 300 continues in an endless loop in the manner described above until shutdown.

Although specific examples of lower threshold and upper threshold values are mentioned above, it should be apparent to those skilled in the art that the figures given are illustrative only. It should be apparent to those skilled in the art that alternate lower and upper threshold values are suitable for use with the present invention and are within the spirit and scope of the present invention.

For the purposes of this detailed description, the term "substantially" when referencing a reference direction, such as "substantially align," "substantially aligned," "substantially parallel," "substantially coplanar," "substantially perpendicular," etc. shall be defined as an orientation that varies less than 45 degrees from the indicated reference direction. For instance, the term "substantially parallel" indicates that the inclination of the item in question deviates less than 45 degrees from a parallel orientation.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. An adjustable cab extender assembly adapted to couple to a vehicle including a tractor coupled to a trailer, the assembly comprising:
   (a) a dynamic cab extender adjustable in length and operable to be disposed in a gap extending between a back end of the tractor and a front end of the trailer;
   (b) a speed sensor operable to sense a speed of the vehicle; and
   (c) a control system coupled in signal communication with the speed sensor and coupled to the dynamic cab extender, wherein the control system is operable to automatically adjust a longitudinal length of the dynamic cab extender to selectively adjust a proximity of a trailing edge of the cab extender relative to the front end of the trailer when the sensed speed exceeds a selected speed.

2. The assembly of claim 1, wherein the dynamic cab extender is further comprised of a first panel and a second panel, wherein the first panel is reciprocal within a cavity of the second panel to adjust the longitudinal length of the dynamic cab extender.

3. The assembly of claim 2 further comprising an extender actuator coupled to the first panel and the second panel, the extender actuator adjustable in length to reciprocate the first panel relative to the second panel, wherein the extender actuator is oriented substantially parallel to a longitudinal axis of the vehicle.

4. The assembly of claim 1, wherein the dynamic cab extender is configurable between a stowed position and a deployed position in which the cab extender is oriented substantially parallel with the sides of the tractor.

5. The assembly of claim 4, wherein the control system is adapted to configure the dynamic cab extender into the stowed position when the speed of the vehicle falls below a predetermined speed.

6. The assembly of claim 4, further comprising a linkage assembly coupled to the dynamic cab extender and adaptable to couple to the back end of the tractor, wherein the linkage assembly is operable to rotate the dynamic cab extender between the stowed position and the deployed position.

7. The assembly of claim 6, wherein the linkage assembly is comprised of a first link coupled in an end to end relationship with a second link, wherein a first end of the first link is adaptable to couple to a back surface of the tractor and a first end of the second link is coupled to the dynamic cab extender, and wherein the second ends of the first and second links are coupled to one another.

8. The assembly of claim 7, wherein the first link is coupled to a joint having at least two axes of freedom of movement, the joint adapted to couple the first link to the back end of the tractor.

9. The assembly of claim 7, wherein the second link is coupled to a joint having two axes of freedom of movement, the joint adapted to couple the second link to the cab extender.

10. The assembly of claim 7, further including a deployment actuator coupled to the linkage assembly, the deployment actuator adjustable in length to reciprocate the dynamic cab extender from the deployed position to the stowed position.

11. The assembly of claim 1, wherein the control system is adapted to configure the dynamic cab extender into a stowed position when the speed of the vehicle is less than a predetermined speed.

12. The assembly of claim 1 further including a fixed cab extender adapted to be coupled to the vehicle so as to span a portion of the gap, wherein the fixed cab extender is adapted to substantially align with a lateral side of the vehicle.

13. The assembly of claim 12, wherein the fixed cab extender has a selected length chosen to permit the tractor to pivot about the trailer a selected angular range without the front of the trailer contacting the fixed cab extender.

14. The assembly of claim 13, wherein the selected angular range is greater than about 90 degrees.

15. An adjustable cab extender assembly adapted to couple to a vehicle including a tractor coupled to a trailer, the assembly comprising:
   (a) a dynamic cab extender operable to be disposed in a gap extending between a back end of the tractor and a front end of the trailer; and
   (b) a control system coupled to the dynamic cab extender, the control assembly including;
      (i) a first actuator adapted to adjust a longitudinal length of the dynamic cab extender to selectively adjust the proximity of a trailing edge of the dynamic cab extender to the front end of the trailer; and
      (ii) a second actuator adapted to configure the dynamic cab extender between a stowed position and a deployed position in which the dynamic cab extender is substantially aligned with a lateral side of the vehicle.

16. The assembly of claim 15, wherein the dynamic cab extender is further comprised of a first panel reciprocal at least partially within a cavity of a second panel to adjust the longitudinal length of the dynamic cab extender.

17. The assembly of claim 15, further comprising a linkage assembly coupled to the dynamic cab extender and adaptable to couple to the back end of the tractor, wherein the linkage assembly is operable to reciprocate the dynamic cab extender between the stowed position and the deployed position.

18. The assembly of claim 17, wherein the linkage assembly is comprised of a first link coupled in an end to end relationship with a second link, wherein a first end of the first link is adaptable to couple to a back surface of the tractor and a first end of the second link is coupled to the dynamic cab extender, and wherein the second ends of the first and second links are coupled to one another.

19. The assembly of claim 18, wherein the first link is coupled to a joint having two axes of freedom of movement, the joint adapted to couple the first link to the back end of the tractor.

20. The assembly of claim 18, wherein the second link is coupled to a joint having two axes of freedom of movement, the joint adapted to couple the second link to the dynamic cab extender.

21. The assembly of claim 15, wherein the control system further includes a speed sensor adapted to sense a speed of the vehicle and wherein the control system is adapted to configure the dynamic cab extender into the deployed position when the speed of the vehicle exceeds a selected speed.

22. The assembly of claim 15, wherein the control system further includes a speed sensor adapted to sense a speed of the vehicle and wherein the control system is adapted to configure the dynamic cab extender into the stowed position when the speed of the vehicle is below a predetermined speed.

23. The assembly of claim 15 further including a fixed cab extender adapted to be coupled to the vehicle so as to span a portion of the gap, wherein the fixed cab extender is adapted to substantially align in the gap with the dynamic cab extender when the dynamic cab extender is in the deployed position.

24. The assembly of claim 23, wherein the fixed cab extender has a selected length chosen to permit the tractor to pivot about the trailer a selected angular range without the front of the trailer contacting the fixed cab extender.

25. An adjustable cab extender assembly adapted to couple to a vehicle including a tractor coupled to a trailer, the assembly comprising:

a dynamic cab extender adjustable in length and adapted to be coupled to the vehicle, the dynamic cab extender configurable between a deployed position in which the dynamic cab extender is oriented substantially coplanar with a lateral side of the vehicle in a gap extending between a back end of the tractor of the vehicle and a front end of the trailer of the vehicle, a stowed position in which the dynamic cab extender is stowed behind the back end of the tractor within the gap and inclined relative to the lateral side of the vehicle, and an extended position in which the dynamic cab extender is oriented substantially coplanar with the lateral side of the vehicle in the gap, wherein a length of the dynamic cab extender when in the extended position exceeds a length of the dynamic cab extender when in the deployed position.

26. The assembly of claim 25, further comprising a control system for selectively actuating the dynamic cab extender between the stowed, deployed, and extended positions, wherein the control system is adapted to configure the dynamic cab extender into the deployed position when the speed of the vehicle exceeds a selected speed.

27. The assembly of claim 25, further comprising a control system for selectively actuating the dynamic cab extender between the stowed, deployed, and extended positions, wherein the control system is adapted to configure the dynamic cab extender into the stowed position when the speed is below a predetermined speed.

28. The assembly of claim 25, wherein the dynamic cab extender is further comprised of a first panel reciprocal at least partially within a cavity of a second panel to adjust the length of the dynamic cab extender.

29. The assembly of claim 25 further including a fixed cab extender adapted to be coupled to the vehicle so as to span a portion of the gap, wherein the fixed cab extender is adapted to substantially align in the gap with the dynamic cab extender when the dynamic cab extender is in the deployed position.

30. A method of adjusting a longitudinal length of a cab extender disposed in a gap located between a tractor and a trailer, the method comprising:

(a) sensing a speed of the tractor; and (b) automatically adjusting a longitudinal length of the dynamic cab extender to selectively position a trailing edge of the dynamic cab extender a selected distance from a front end of the trailer when the sensed speed of the tractor exceeds a selected speed.

31. The method of claim 30, further comprising configuring the dynamic cab extender between a deployed position in which the dynamic cab extender is oriented substantially parallel with the lateral sides of the tractor and a stowed position in which the dynamic cab extender is disposed substantially perpendicular to the lateral sides of the tractor.

32. The method of claim 31, further comprising automatically configuring the dynamic cab extender in the stowed position when the sensed speed of the tractor is less than a predetermined speed.

33. The method of claim 30, further comprising adjusting the longitudinal length of the dynamic cab extender by reciprocating a first panel of the dynamic cab extender at least partially within a cavity of a second panel of the dynamic cab extender.

* * * * *

UNITED STATES PATENT AND TRADEMARK OFFICE
CERTIFICATE OF CORRECTION

PATENT NO. : 6,846,035 B2
DATED : January 25, 2005
INVENTOR(S) : A.C. Wong et al.

It is certified that error appears in the above-identified patent and that said Letters Patent is hereby corrected as shown below:

<u>Title page,</u>
Item [73], Assignee "Paccar Inc," should read -- PACCAR Inc, --

Signed and Sealed this

Seventh Day of June, 2005

JON W. DUDAS
*Director of the United States Patent and Trademark Office*